US010122936B2

United States Patent
Weng et al.

(10) Patent No.: US 10,122,936 B2
(45) Date of Patent: Nov. 6, 2018

(54) DYNAMIC NOISE REDUCTION FOR HIGH DYNAMIC RANGE IN DIGITAL IMAGING

(71) Applicant: MediaTek Inc., Hsinchu (TW)

(72) Inventors: Chi-Jung Weng, Hsinchu County (TW); Chen-Tsai Ho, Taichung (TW)

(73) Assignee: MediaTek Inc., Hsinchu (TW)

( * ) Notice: Subject to any disclaimer, the term of this patent is extended or adjusted under 35 U.S.C. 154(b) by 82 days.

(21) Appl. No.: 14/843,989

(22) Filed: Sep. 2, 2015

(65) Prior Publication Data
US 2015/0381870 A1    Dec. 31, 2015

(51) Int. Cl.
| | | |
|---|---|---|
| *H04N 5/235* | (2006.01) | |
| *G06T 5/00* | (2006.01) | |
| *H04N 5/217* | (2011.01) | |

(52) U.S. Cl.
CPC .......... *H04N 5/2355* (2013.01); *G06T 5/002* (2013.01); *H04N 5/217* (2013.01); *G06T 2207/20012* (2013.01); *G06T 2207/20208* (2013.01)

(58) Field of Classification Search
CPC ...... H04N 5/2355; H04N 5/217; G06T 5/002; G06T 2207/20012; G06T 2207/20208; G06T 5/20; G06T 7/13; G06K 9/4604
See application file for complete search history.

(56) References Cited

U.S. PATENT DOCUMENTS

| | | | | |
|---|---|---|---|---|
| 2008/0111901 | A1* | 5/2008 | Kawashima | G06T 5/002 348/241 |
| 2009/0046947 | A1* | 2/2009 | Kobayashi | G06T 5/50 382/284 |
| 2009/0174792 | A1* | 7/2009 | Kusaka | H04N 5/235 348/230.1 |
| 2010/0092102 | A1* | 4/2010 | Sun | G06K 9/40 382/260 |
| 2010/0150473 | A1* | 6/2010 | Kwon | G06T 5/50 382/284 |
| 2010/0278423 | A1* | 11/2010 | Itoh | G06T 5/008 382/169 |
| 2010/0310190 | A1* | 12/2010 | Lin | H04N 5/35509 382/260 |
| 2011/0249151 | A1* | 10/2011 | Ito | G06T 5/002 348/241 |
| 2012/0038797 | A1* | 2/2012 | Jang | H04N 5/2355 348/241 |
| 2012/0188373 | A1* | 7/2012 | Kwon | H04N 1/409 348/148 |

(Continued)

*Primary Examiner* — Roberto Velez
*Assistant Examiner* — Tuan Le
(74) *Attorney, Agent, or Firm* — Han IP PLLC; Andy M. Han

(57) ABSTRACT

Implementations pertaining to dynamic noise reduction for high dynamic range (HDR) in digital imaging are described. A method may involve receiving a data related to digital imaging. The method may also involve determining a respective HDR enhancement ratio for each of one or more portions of a plurality of portions of the data. The method may further involve determining a respective level of noise reduction corresponding to the respective HDR enhancement ratio for each of the one or more portions of the data. The method may additionally involve performing noise reduction up to the respective level of noise reduction for each of the one or more portions of the data.

30 Claims, 5 Drawing Sheets

(56) References Cited

U.S. PATENT DOCUMENTS

| | | | |
|---|---|---|---|
| 2014/0044375 A1* | 2/2014 | Xu | G06T 5/00 |
| | | | 382/260 |
| 2014/0064613 A1* | 3/2014 | Wu | G06T 5/002 |
| | | | 382/167 |
| 2014/0079333 A1* | 3/2014 | Hirai | H04N 5/23235 |
| | | | 382/255 |
| 2015/0213766 A1* | 7/2015 | Sugimoto | G09G 3/3406 |
| | | | 345/690 |

\* cited by examiner

DYNAMIC NOISE REDUCTION FOR HIGH DYNAMIC RANGE IN DIGITAL IMAGING

TECHNICAL FIELD

The present disclosure is generally related to digital imaging and, more particularly, to noise reduction for high dynamic range in digital imaging.

BACKGROUND

Unless otherwise indicated herein, approaches described in this section are not prior art to the claims listed below and are not admitted to be prior art by inclusion in this section.

The term "high dynamic range", or "HDR", typically refers to a set of techniques used in imaging and photography to reproduce a dynamic range of luminosity greater than what is possible with standard digital imaging or photographic techniques. A purpose of HDR is to present the human eye with a range of luminance similar to what is familiar to the human eye in everyday life. Currently applications of HDR are widely adopted in digital imaging. One main application of HDR is for scenes with high contrast, for which HDR can enhance the brightness of relatively darker regions in a scene of high contrast to a desired level. This would improve the dynamic contrast for the overall image to present an image that is closer to what is seen by a human eye.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide a solution to provide digital imagery of optimal quality after HDR processing. The term "digital imagery" herein refers to results of digital imaging including, for example and not limited to, previews, still images and video images. Implementations in accordance with the present disclosure analyze the amount of intensity or brightness to be enhanced by HDR for a given region or pixel, convert the level of brightness to an enhancement ratio and map to a corresponding strength or level of noise reduction, and individually perform noise reduction for affected regions or pixels according to the respective strength or level of noise reduction.

In one example implementation, a method implementable in an image signal processor or an imaging apparatus may involve a processor receiving a data related to digital imaging, e.g., after the data has been captured by an imaging device and processed for HDR. The method may also involve the processor determining a respective HDR enhancement ratio for each of one or more portions of a plurality of portions of the data. The method may further involve the processor determining a respective level of noise reduction corresponding to the respective HDR enhancement ratio for each of the one or more portions of the data. The method may additionally involve the processor performing noise reduction up to the respective level of noise reduction for each of the one or more portions of the data.

In another example implementation, a method implementable in an image signal processor of an imaging apparatus may involve a processor receiving a data related to digital imaging, e.g., after the data has been captured by an imaging device and processed for HDR. The method may also involve the processor determining a first level of HDR enhancement in a level of brightness for a first portion of a plurality of portions of the data and a second level of HDR enhancement in the level of brightness for a second portion of the plurality of portions of the data. The first level of HDR enhancement and the second level of HDR enhancement may be different. The method may further involve the processor performing a first level of noise reduction for the first portion of the data and a second level of noise reduction for the second portion of the data. The first level of noise reduction and the second level of noise reduction may be different.

In yet another example implementation, an apparatus may include an HDR engine, a computation engine, and a noise reduction engine. The HDR engine may be configured to receive a data related to digital imaging and perform HDR processing on the data to output an HDR-processed data. The computation engine may be coupled to the HDR engine. The computation engine may be configured to receive the HDR-processed digital engine and perform a number of operations. For instance, the computation engine may determine a respective HDR enhancement ratio for each of one or more portions of a plurality of portions of the HDR-processed data. The computation engine may also determine a respective level of noise reduction corresponding to the respective HDR enhancement ratio for each of the one or more portions of the HDR-processed data. The noise reduction engine may be coupled to the computation engine, and may be configured to perform noise reduction up to the respective level of noise reduction for each of the one or more portions of the HDR-processed data.

Accordingly, implementations in accordance with the present disclosure avoid applying the same level of noise reduction to all regions, pixels or portions of a preview, image or video frame regardless of the HDR enhancement ratio of each region, pixel or portion. Rather, implementations in accordance with the present disclosure perform noise reduction for each region, pixel or portion of a preview, image or video frame up to a respective level of noise reduction that corresponds to the respective level of HDR enhancement ratio for that region, pixel or portion of the preview, image or video frame. Advantageously, implementations in accordance with the present disclosure are designed to provide digital imagery of optimal quality after HDR processing.

BRIEF DESCRIPTION OF THE DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Overview

When using conventional techniques of HDR to process digital imaging of scenes of high contrast, often time there are side effects associated with enhancing the brightness of relatively darker regions in a scene of high contrast. One of the side effects of concern is the luma noise and chroma noise as a result of enhancing the brightness of relatively darker regions. With new techniques of HDR, however, it is feasible to enhance the brighten regions of different levels of darkness to a desired level of brightness. A preview, image or video frame may be processed by HDR at pixel level or by regions (with the image divided into multiple regions).

Generally speaking, noise reduction is a way to reduce or minimize noise in signal/image processing, and can be utilized to reduce or minimize noise in relatively darker regions of a preview, image or video frame that are brightened up by HDR. However, if the same strength of noise reduction is applied to all relatively darker regions of the preview, image or video frame, one or more situations may arise, as described below. When the strength of applied noise reduction is too weak, the level of noise in regions/pixels for which the level of brightness has been enhanced more than other regions/pixels of the preview, image or video frame may remain high. When the strength of applied noise reduction is too strong, noise in regions/pixels not as dark or originally at normal level of brightness may be eliminated but the entire preview, image or video frame may be blurred. When the strength of applied noise reduction is not too weak or too strong, relatively darker regions may still be noisy while regions not as dark or originally at normal level of brightness may be blurred. Thus, even after a preview, image or video frame is processed with HDR, the noise levels in different regions of the preview, image or video frame may be different or inconsistent. This is undesirable.

In view of the above, implementations of the present disclosure analyze the amount of intensity or brightness to be enhanced by HDR for each of a number of regions or pixels of a preview, image or video frame, convert the level of brightness to an enhancement ratio and map to a corresponding strength of noise reduction, and then perform noise reduction for affected regions or pixels individually. Accordingly, it is believed that implementations of the present disclosure can provide digital imagery of optimal quality.

Example Algorithm

Figure 1:
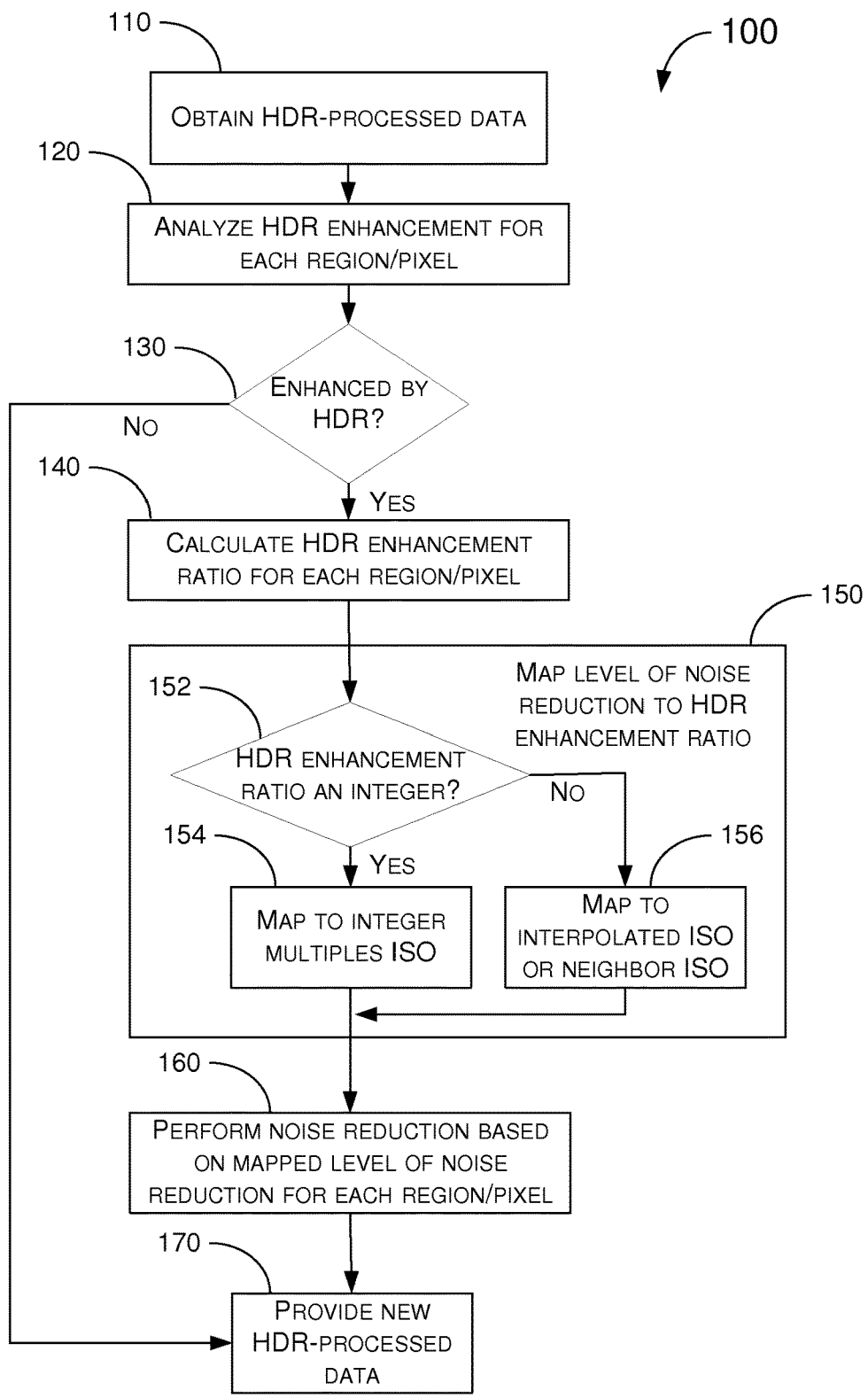
FIG. 1 is a flowchart of an example algorithm in accordance with an implementation of the present disclosure.

FIG. 1 illustrates an example algorithm 100 in accordance with an implementation of the present disclosure. Example algorithm 100 addresses the aforementioned issue of inconsistency in noise levels in different regions of a preview, image or video frame in which the levels of brightness having been enhanced by HDR. Example algorithm 100 may process different regions of a preview, image or video frame with different degrees of noise reduction based on the respective amount of brightness enhancement by HDR for each region of the preview, image or video frame.

Example algorithm 100 may include one or more operations, actions, or functions as illustrated by one or more of blocks 110, 120, 130, 140, 150, 160 and 170 as well as sub-blocks 152, 154 and 156. Although illustrated as discrete blocks, various blocks may be divided into additional blocks, combined into fewer blocks, or eliminated, depending on the desired implementation. Example algorithm 100 may begin at block 110.

At 110 (Obtain HDR-processed data), example algorithm 100 may involve obtaining a data related to digital imaging that has been processed for HDR (herein interchangeably referred to as "HDR-processed data"). The data related to digital imaging may include, for example, a preview, image or video frame. The data related to digital imaging may be captured, obtained or otherwise taken by an imaging device, e.g., camera, for HDR processing. Different regions and pixels of the HDR-processed data may be associated with different levels of enhancement in brightness due to the fact that different regions and pixels of the HDR-processed data may have different degrees of darkness. As an example, a first region which is relatively darker than a second region of the HDR-processed data may be associated with a first level of enhancement in brightness, while the second region may be associated with a second level of enhancement in brightness. In this example the first level of enhancement in brightness would be greater than the second level of enhancement in brightness since the first region is relatively darker than the second region. Block 110 may be followed by block 120.

At 120 (Analyze HDR enhancement ratio for each region/pixel), example algorithm 100 may involve analyzing the HDR-processed data to determine or otherwise compute the level of enhance in brightness associated with each region or pixel of the HDR-processed data, thereby determining an HDR enhancement ratio for each region or pixel. Block 120 may be followed by block 130.

At 130 (Enhanced by HDR?), example algorithm 100 may involve determining whether or not one or more regions or pixels of the HDR-processed data has/have been enhanced by HDR, e.g., by determining whether the respective HDR enhancement ratio associated with a given region or pixel of the HDR-processed data is greater than 1. In an event that it is determined that no region or pixel of the HDR-processed data has been enhanced by HDR, e.g., the HDR enhancement ratio for each of the regions or pixels of the HDR-processed data is not greater than 1, then example algorithm 100 may proceed to block 170 to provide the HDR-processed data as a new HDR-processed data. In an event that it is determined that one or more regions or pixels of the HDR-processed data has/have been enhanced by HDR, e.g., the HDR enhancement ratio for each of the one or more regions or pixels of the HDR-processed data is greater than 1, then example algorithm 100 may proceed to block 140.

At 140 (Calculate HDR enhancement ratio for each region/pixel), example algorithm 100 may calculate, compute or otherwise determine the respective HDR enhancement ratio associated with each region or pixel of the HDR-processed data. Block 140 may be followed by block 150.

At 150 (Map level of noise reduction to HDR enhancement ratio), example algorithm 100 may map the HDR enhancement ratio of each region or pixel of the HDR-processed data to a corresponding strength or level of noise reduction. Block 150 may include sub-blocks 152, 154 and 156, and may be followed by block 160.

At sub-block 152 (HDR enhancement ratio an integer?), example algorithm 100 may determine, for each region or pixel of the HDR-processed data, whether the respective HDR enhancement ratio is an integer or a multiple of an integer. In an event that it is determined that the respective HDR enhancement ratio is an integer or a multiple of an integer, example algorithm 100 may proceed to sub-block 154; otherwise, example algorithm 100 may proceed to sub-block 156.

At sub-block 154 (Map to integer multiples ISO), example algorithm 100 may map the respective HDR enhancement ratio to a corresponding level of sensitivity of light of a plurality of levels of sensitivity of light of an imaging device that captured the data. For instance, example algorithm 100 may map the respective HDR enhancement ratio to a corresponding integer multiples of one of multiple International Standard Organization (ISO) settings of the imaging device, e.g., camera, that captured the data. Example algorithm 100 may proceed to block 160.

At sub-block 156 (Map to interpolated ISO or neighbor ISO), example algorithm 100 may map the respective HDR enhancement ratio to an interpolated level of sensitivity of light based on the plurality of levels of sensitivity of light of the imaging device. For instance, example algorithm 100 may map the respective HDR enhancement ratio to an interpolated or a nearest ISO setting of the imaging device. The interpolated or nearest ISO setting may be an ISO setting of the imaging device among the multiple ISO settings of the imaging device that is closest to a rounded-up (or rounded-down) integer or integer multiple of the respective HDR enhancement ratio. Example algorithm 100 may proceed to block 160.

At block 160 (Perform noise reduction based on mapped level of noise reduction for each region/pixel), example algorithm 100 may perform noise reduction granularly, e.g., region-by-region or pixel-by-pixel, such that the strength or level of noise reduction performed on or otherwise applied to each region or pixel of the HDR-processed data corresponds to the respective HDR enhancement ratio thereof. Block 160 may be followed by block 170.

At 170 (Provide new HDR-processed data), example algorithm 100 may provide the outcome of block 160 as a new HDR-processed data.

Figure 2:
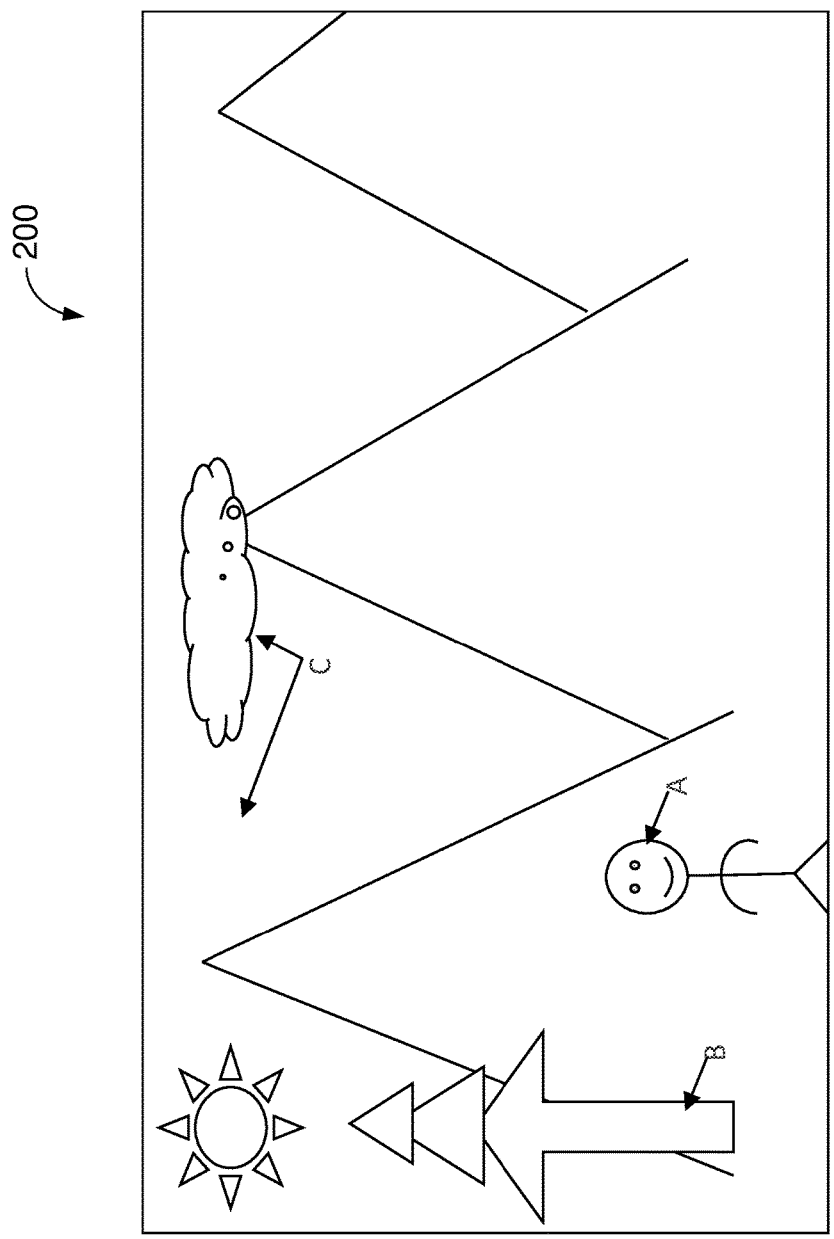
FIG. 2 is a diagram of an example image to which various implementations may be applied in accordance with the present disclosure.

FIG. 2 illustrates an example image 200 to which various implementations may be applied in accordance with the present disclosure. Example image 200 may include a number of regions such as, for example, regions A, B and C. Region A may include a human face, which may be backlit with a mean value of level of brightness at a value of 20. Region B may include a tree, which may be slightly backlit with a mean value of level of brightness at a value of 60. Region C may include the sky and clouds, which may be well-lit with a mean value of level of brightness at a value of 160. In other words, example image 200 may be partially-backlit.

HDR processing may process the partially-backlit example image 200 so that a target mean value associated with a level of brightness for the entirety of example image 200 may be set to a value of 140. Accordingly, the level of brightness associated with the relatively darker region A may be enhanced by HDR, with the mean value increased from 20 to 140. Similarly, the level of brightness associated with the normally-lit region B may be enhanced by HDR, with the mean value increased from 60 to 140. On the other hand, the well-lit region C, having a mean value of 160 which is greater than 140, requires no HDR processing to enhance the level of brightness thereof. As a result, the respective HDR enhancement ratio for region A may be 2.8 (e.g., $\log_2(140/20)$) and the respective HDR enhancement ratio for region B may be 1.2 (e.g., $\log_2(140/60)$). The respective HDR enhancement ratio for region C may be 0 since the mean value of region C, 160, is already higher than the target mean value for the entire example image 200, which is 140.

In this example, given that the respective HDR enhancement ratio for each of regions A and B is not an integer or a multiple of an integer, the respective HDR enhancement ratio for each of regions A and B may be mapped to an interpolated or nearest ISO setting. For instance, given that the respective HDR enhancement ratio for region A is 2.8 and that the setting of ISO100 is used as the level of sensitivity of light when no HDR processing is required, the corresponding level of sensitivity of light, or ISO setting, for region A would be ISO696 (=ISO($2^{2.8} \times 100$)). Thus, the interpolated or nearest ISO setting used for noise reduction for region A may be ISO800. Likewise, given that the respective HDR enhancement ratio for region B is 1.2 and that the setting of ISO100 is used as the level of sensitivity of light when no HDR processing is required, the corresponding level of sensitivity of light, or ISO setting, for region B would be ISO230 (=ISO($2^{1.2} \times 100$)). Thus, the interpolated or nearest ISO setting used for noise reduction for region B may be ISO200.

Accordingly, with different levels of HDR enhancement for different portions of a preview, image or video frame, e.g., example image 200, different levels of noise reduction may be performed on or otherwise applied to different portions of the preview, image or video frame. This is different from the conventional approach of applying the same strength or level of noise reduction to the entire preview, image or video frame, thus resulting in a preview, image or video frame that is rather noisy or blurry. Advantageously, for each portion of a number of portions of a preview, image or video frame, implementations in accordance with the present disclosure apply a strength or level of noise reduction corresponding to the respective HDR enhancement ratio to avoid rendering the resultant preview, image or video frame noisy or blurry.

Figure 3:
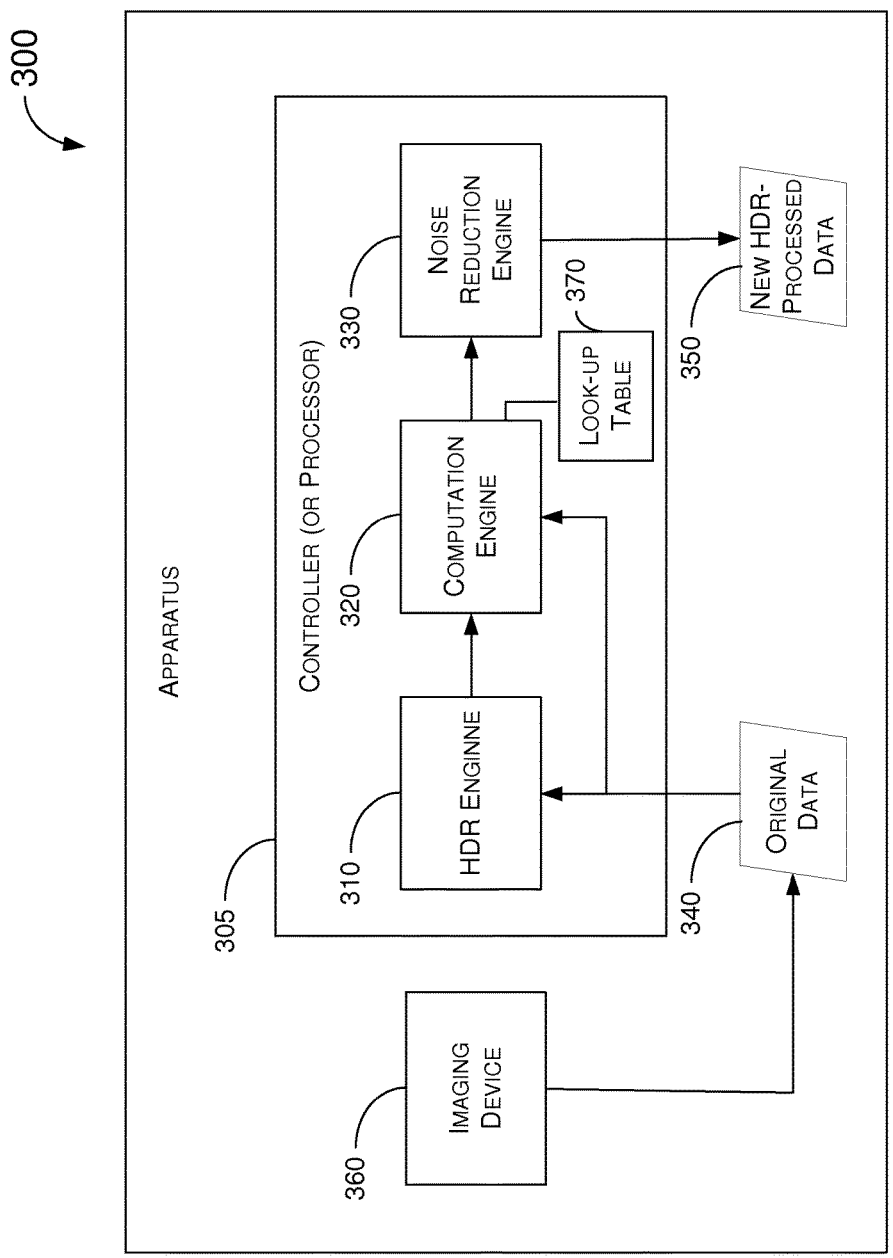
FIG. 3 is a block diagram of an example apparatus in accordance with an implementations of the present disclosure.

FIG. 3 illustrates an example apparatus 300 in accordance with an implementations of the present disclosure. Example apparatus 300 may be configured to implement example algorithm 100 or any variation thereof. Example apparatus 300 may also be configured to implement each of example process 400 and 500, described below, and any variation thereof.

Apparatus 300 may include a controller 305 which may include a computation engine 320. In some implementations, apparatus 300 may include a processor in place of controller 305, and in such cases description herein with respect to controller 305 is applicable to such processor. Computation engine 320 may be configured to receive a pre-HDR processing version of a data related to digital imaging and an HDR-processed version of the data. Computation engine 320 may be also configured to determine a respective HDR enhancement ratio for each of one or more portions, e.g., regions or pixels, of a plurality of portions of the HDR-processed data. Computation engine 320 may be further configured to determine a respective level of noise reduction corresponding to the respective HDR enhancement ratio for each of the one or more portions of the HDR-processed data. The data related to digital imaging may include, for example and not limited to, a preview, image or video frame. For instance, computation engine 320 may receive the data after the data has been captured by an imaging device, e.g., imaging device 360, and processed for HDR.

In some implementations, in determining the respective HDR enhancement ratio for each of the one or more portions of the plurality of portions of the data, computation engine 320 may be configured to perform a number of operations. For instance, computation engine 320 may determine a post-HDR target mean value associated with a level of brightness for the data. Moreover, for each of the one or more portions of the data, computation engine 320 may determine a respective mean value associated with a level of brightness by comparing the HDR-processed version of the data and a pre-HDR processing version of the data, and calculate the respective HDR enhancement ratio based on a ratio between the target mean value and the respective mean value.

In some implementations, in calculating the respective HDR enhancement ratio, computation engine 320 may be configured to set the respective HDR enhancement ratio to 1 in an event that the respective mean value is greater than or equal to the target mean value.

In some implementations, the target mean value may be user-definable with respect to each portion of the data such that a first target mean value associated with a first portion of the data and a second target mean value associated with a second portion of the data are different. For instance, a user may set, configure or otherwise define different target mean values for different portions of a given preview, image or video frame when the user may wish not to brighten different relatively darker portions to the same level of brightness. This may be the case when the user may wish to show shading at different degrees of shades in the preview, image or video frame. Alternatively or additionally, this may be the case when the user may wish to avoid boosting too much noise in the preview, image or video frame.

In some implementations, in determining the respective level of noise reduction corresponding to the respective HDR enhancement ratio for each of the one or more portions of the data, computation engine 320 may be configured to perform a number of operations. For instance, for each of the one or more portions of the data, computation engine 320 may determine whether the respective HDR enhancement ratio is a multiple of an integer. Computation engine 320 may also, for each of the one or more portions of the data, map the respective HDR enhancement ratio to a corresponding level of sensitivity of light of a plurality of levels of sensitivity of light of an imaging device that captured the data in response to a determination that the respective HDR enhancement ratio is a multiple of an integer. Computation engine 320 may refer to a look-up table (e.g., look-up table 370) in performing the mapping of the respective HDR enhancement ratio to a corresponding level of sensitivity of light of a plurality of levels of sensitivity of light of an imaging device that captured the data. Additionally, computation engine 320 may, for each of the one or more portions of the data, map the respective HDR enhancement ratio to an interpolated level of sensitivity of light based on the plurality of levels of sensitivity of light of the imaging device in response to a determination that the respective HDR enhancement ratio is not a multiple of an integer. Computation engine 320 may refer to a look-up table (e.g., look-up table 370) in performing the mapping of the respective HDR enhancement ratio to an interpolated level of sensitivity of light based on the plurality of levels of sensitivity of light of the imaging device.

In some implementations, computation engine 320 may be further configured to identify a plurality of regions in the data, each region of the plurality of regions having a respective mean value associated with a level of brightness. Additionally, computation engine 320 may divide the data into the plurality of portions according to the plurality of regions prior to the determining of the respective HDR enhancement ratio for each of the one or more portions of the data.

In some implementations, apparatus 300 may also include an HDR engine 310 and a noise reduction engine 330, either or both of which may be part of controller 305, as shown in FIG. 3. In other implementations, each of HDR engine 310 and noise reduction engine 330 may be physically separate from controller 305. HDR engine 310 may be configured to receive the data and perform HDR processing on the data to output the HDR-processed version of the data, as input to computation engine 320. Noise reduction engine 330 may be coupled to computation engine 320, and may be configured to perform noise reduction up to the respective level of noise reduction for each of the one or more portions of the HDR-processed version of the data.

In some implementations, HDR engine 310 may be configured with a noise reduction function to perform noise reduction on the regions or pixels of a given preview, image or video frame. Nevertheless, the noise reduction function of HDR engine 310 may be turned off at least when HDR engine 310 performs HDR processing on the data.

In some implementations, in performing noise reduction up to the respective level of noise reduction for each of the one or more portions of the data, noise reduction engine 330 may be configured to skip noise reduction for a particular portion of the one or more portions of the data in an event that the respective HDR enhancement ratio of the particular portion is 1.

In some implementations, apparatus 300 may include imaging device 360. For instance, apparatus 300 may be a smartphone or a mobile device equipped with imaging device 360, e.g., a camera, capable of capturing still images and/or videos to provide a preview, image or video frame as original data 340 related to digital imaging.

In the example shown in FIG. 3, HDR engine 310 may receive original data 340 as input to perform HDR processing on original data 340 to output an HDR-processed data related to digital imaging. Computation engine 320 may receive both the original data 340 and the HDR-processed data as input to perform analysis, e.g., in accordance with example algorithm 100 or any variation thereof. Computation engine 320 may output results of mapping of level of noise reduction to HDR enhancement ratio for one or more portions, e.g., regions or pixels, of the HDR-processed data. Noise reduction engine 330 may receive both the HDR-processed data and the results of mapping as input to perform noise reduction for one or more portions, e.g., regions or pixels, of the HDR-processed data, e.g., in accordance with example algorithm 100 or any variation thereof, to output a new HDR-processed data 350.

Figure 4:
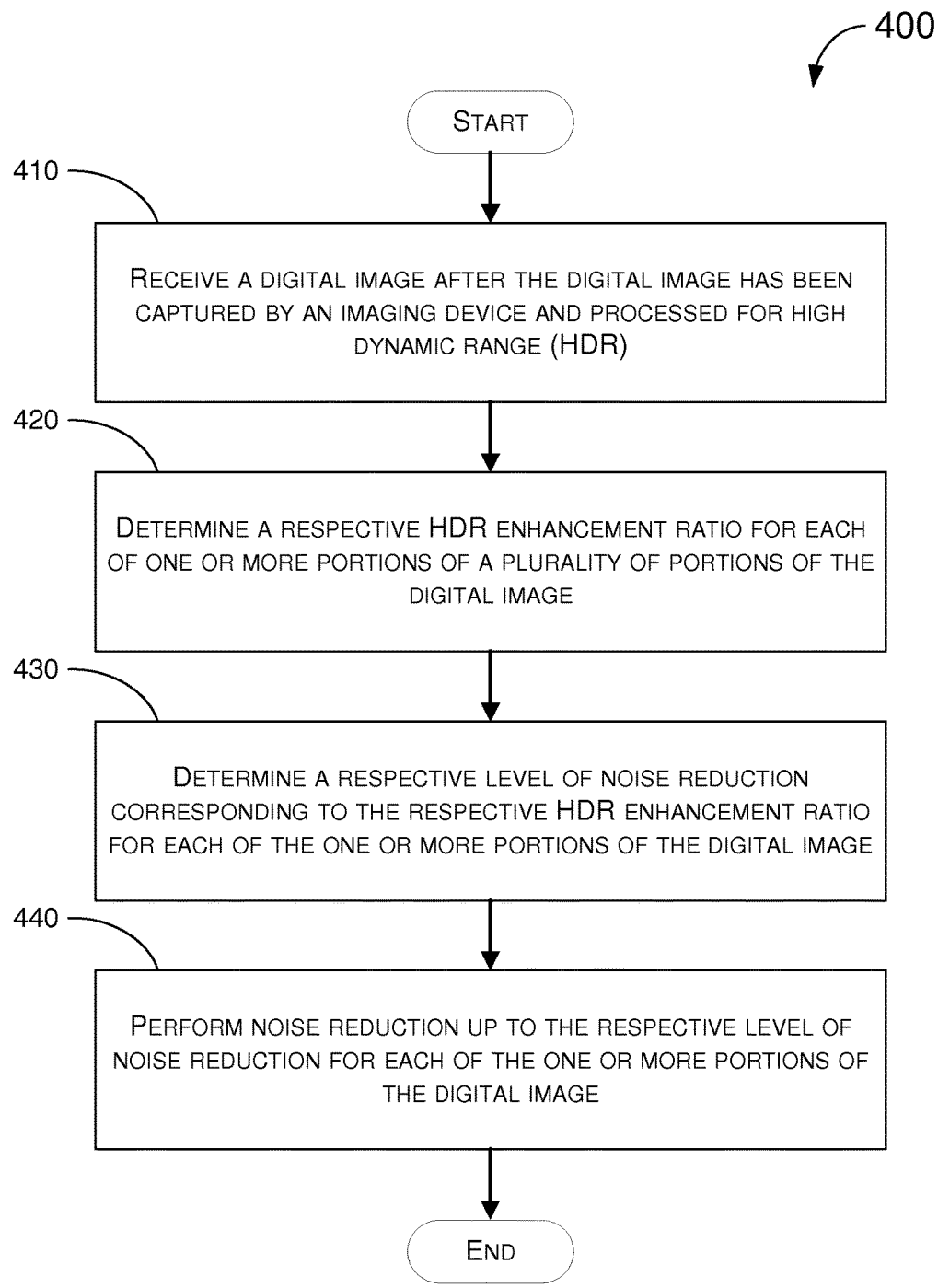
FIG. 4 is a flowchart of an example process in accordance with an implementation of the present disclosure.

FIG. 4 is a flowchart of an example process 400 in accordance with an implementation of the present disclosure. Example process 400 may represent another aspect of implementing features of example algorithm 100. Example process 400 may include one or more operations, actions, or functions as illustrated by one or more of blocks 410, 420, 430 and 440. Although illustrated as discrete blocks, various blocks may be divided into additional blocks, combined into fewer blocks, or eliminated, depending on the desired implementation. Example process 400 may be implemented by controller 305 of example apparatus 300. Solely for illustrative purposes, the operations of example process 400 are described below in the context of example process 400 being performed by controller 305 of example apparatus 300. Example process 400 may begin at block 410.

Block 410 may refer to controller 305 receiving a data related to digital imaging. The data may include, for example, a preview, image or video frame. For instance, controller 305 may receive the data after the data (e.g., preview, image or video frame) has been captured by an imaging device and processed for HDR. Block 410 may be followed by block 420.

Block 420 may refer to controller 305 determining a respective HDR enhancement ratio for each of one or more portions of a plurality of portions of the data. Block 420 may be followed by block 430.

Block 430 may refer to controller 305 determining a respective level of noise reduction corresponding to the respective HDR enhancement ratio for each of the one or more portions of the data. Block 430 may be followed by block 440.

Block 440 may refer to controller 305 performing noise reduction up to the respective level of noise reduction for each of the one or more portions of the data.

In some implementations, with respect to the determining of the respective HDR enhancement ratio for each of the one or more portions of the plurality of portions of the data, example process 400 may involve controller 305 determining a post-HDR target mean value associated with a level of brightness for the data. For each of the one or more portions of the data, example process 400 may also involve controller 305 determining a respective mean value associated with a level of brightness. Further, for each of the one or more portions of the data, example process 400 may involve controller 305 calculating the respective HDR enhancement ratio based on a ratio between the target mean value and the respective mean value.

In some implementations, with respect to the calculating of the respective HDR enhancement ratio, example process 400 may involve controller 305 setting the respective HDR enhancement ratio to 1 in an event that the respective mean value is greater than or equal to the target mean value.

In some implementations, the target mean value may be user-definable with respect to each portion of the data such that a first target mean value associated with a first portion of the data and a second target mean value associated with a second portion of the data are different.

In some implementations, with respect to the determining of the respective level of noise reduction corresponding to the respective HDR enhancement ratio for each of the one or more portions of the data, example process 400 may involve controller 305 performing a number of operations for each of the one or more portions of the data. For instance, example process 400 may involve controller 305 determining whether the respective HDR enhancement ratio is a multiple of an integer. Example process 400 may also involve controller 305 mapping the respective HDR enhancement ratio to a corresponding level of sensitivity of light of a plurality of levels of sensitivity of light of the imaging device in response to a determination that the respective HDR enhancement ratio is a multiple of an integer. Example process 400 may further involve controller 305 mapping the respective HDR enhancement ratio to an interpolated level of sensitivity of light based on the plurality of levels of sensitivity of light of the imaging device in response to a determination that the respective HDR enhancement ratio is not a multiple of an integer.

In some implementations, with respect to the performing of noise reduction up to the respective level of noise reduction for each of the one or more portions of the data, example process 400 may involve controller 305 skipping noise reduction for a particular portion of the one or more portions of the data in an event that the respective HDR enhancement ratio of the particular portion is 1.

In some implementations, example process 400 may also involve controller 305 identifying a plurality of regions in the data, each region of the plurality of regions having a respective mean value associated with a level of brightness. Example process 400 may additionally involve controller 305 dividing the data into the plurality of portions according to the plurality of regions prior to the determining of the respective HDR enhancement ratio for each of the one or more portions of the data.

Figure 5:
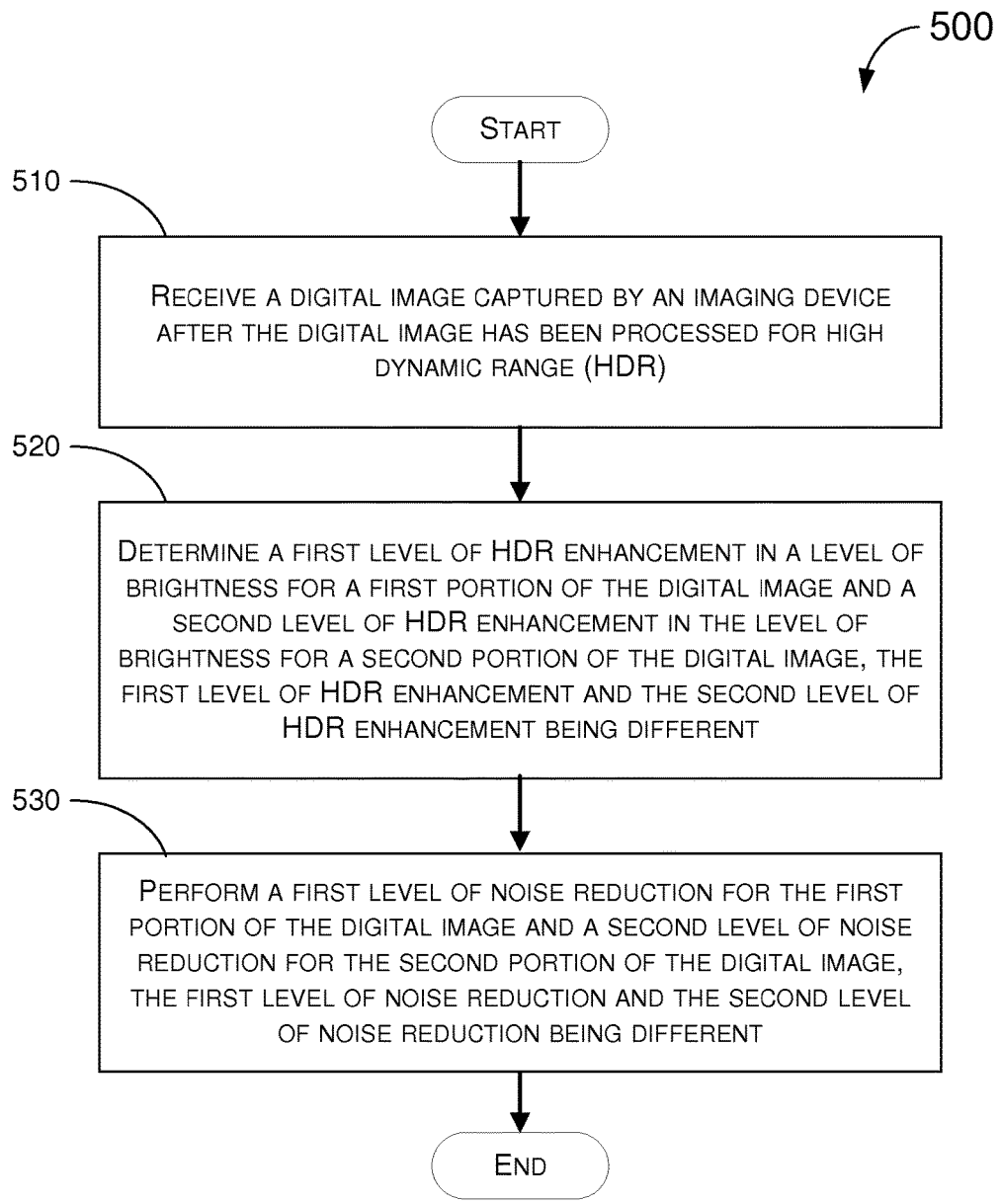
FIG. 5 is a flowchart of an example process in accordance with another implementation of the present disclosure.

FIG. 5 is a flowchart of an example process 500 in accordance with an implementation of the present disclosure. Example process 500 may represent another aspect of implementing features of example algorithm 100. Example process 500 may include one or more operations, actions, or functions as illustrated by one or more of blocks 510, 520 and 530. Although illustrated as discrete blocks, various blocks may be divided into additional blocks, combined into fewer blocks, or eliminated, depending on the desired implementation. Example process 500 may be implemented by controller 305 of example apparatus 300. Solely for illustrative purposes, the operations of example process 500 are described below in the context of example process 500 being performed by controller 305 of example apparatus 300. Example process 500 may begin at block 510.

Block 510 may refer to controller 305 receiving a data related to digital imaging. The data may include, for example, a preview, image or video frame. For instance, controller 305 may receive the data after the data (e.g., preview, image or video frame) has been captured by an imaging device and processed for HDR. Block 510 may be followed by block 520.

Block 520 may refer to controller 305 determining a first level of HDR enhancement in a level of brightness for a first portion of a plurality of portions of the data and a second level of HDR enhancement in the level of brightness for a second portion of the plurality of portions of the data. The first level of HDR enhancement and the second level of HDR enhancement may be different. Block 520 may be followed by block 530.

Block 530 may refer to controller 305 performing a first level of noise reduction for the first portion of the data and a second level of noise reduction for the second portion of the data. The first level of noise reduction and the second level of noise reduction may be different.

In some implementations, with respect to the determining of the first level of HDR enhancement in the level of brightness for the first portion of the data and the second level of HDR enhancement in the level of brightness for the second portion of the data, example process 500 may involve controller 305 determining a respective HDR enhancement ratio for each of the first portion and the second portion of the data.

In some implementations, with respect to the determining of the respective HDR enhancement ratio for each of the first portion and the second portion of the data, example process 500 may involve controller 305 performing a number of operations. For instance, example process 500 may involve controller 305 determining a post-HDR target mean value associated with a level of brightness for the data. For each of the first portion and the second portion of the data, example process 500 may involve controller 305 determining a respective mean value associated with a level of brightness. For each of the first portion and the second portion of the data, example process 500 may also involve controller 305 calculating the respective HDR enhancement ratio based on a ratio between the target mean value and the respective mean value.

In some implementations, with respect to the calculating of the respective HDR enhancement ratio, example process 500 may involve controller 305 setting the respective HDR enhancement ratio to 1 in an event that the respective mean value is greater than or equal to the target mean value.

In some implementations, the target mean value may be user-definable with respect to each portion of the data such that a first target mean value associated with a first portion of the data and a second target mean value associated with a second portion of the data are different.

In some implementations, with respect to the performing of the first level of noise reduction for the first portion of the data and the second level of noise reduction for the second portion of the data, example process 500 may involve controller 305 determining a respective level of noise reduction corresponding to the respective HDR enhancement ratio for each of the first portion and the second portion of the data.

In some implementations, with respect to the determining of the respective level of noise reduction corresponding to the respective HDR enhancement ratio for each of the one or more portions of the data, example process 500 may involve controller 305 performing a number of operations for each of the first portion and the second portion of the data. For instance, example process 500 may involve controller 305 determining whether the respective HDR enhancement ratio is a multiple of an integer. Example process 500 may also involve controller 305 mapping the respective HDR enhancement ratio to a corresponding level of sensitivity of light of a plurality of levels of sensitivity of light of the imaging device in response to a determination that the respective HDR enhancement ratio is a multiple of an integer. Example process 500 may further involve controller 305 mapping the respective HDR enhancement ratio to an interpolated level of sensitivity of light based on the plurality of levels of sensitivity of light of the imaging device in response to a determination that the respective HDR enhancement ratio is not a multiple of an integer.

In some implementations, with respect to the performing of the first level of noise reduction for the first portion of the data and the second level of noise reduction for the second portion of the data, example process 500 may involve controller 305 skipping noise reduction for the first portion or the second portion of the data in an event that the respective HDR enhancement ratio of the first portion or the second portion is 1.

In some implementations, example process 500 may also involve controller 305 identifying a plurality of regions in the data, each region of the plurality of regions having a respective mean value associated with a level of brightness. Example process 500 may additionally involve controller 305 dividing the data into a plurality of portions, including the first portion and the second portion, according to the plurality of regions.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   receiving a high dynamic range (HDR)-processed version of a data related to digital imaging;
   determining a respective HDR enhancement ratio for each of one or more portions of a plurality of portions of the data;
   determining a respective level of noise reduction corresponding to the respective HDR enhancement ratio for each of the one or more portions of the data, wherein the respective level of noise reduction corresponds to a respective amount of enhancement in intensity for each of the one or more portions of the data; and
   performing noise reduction up to the respective level of noise reduction for each of the one or more portions of the data,
   wherein the determining of the respective HDR enhancement ratio for each of the one or more portions of the plurality of portions of the data comprises:
      determining a post-HDR target mean value associated with a level of brightness for the data; and
      for each of the one or more portions of the data:
         determining a respective mean value associated with a level of brightness by comparing the HDR-processed version of the data and a pre-HDR processing version of the data; and
         calculating the respective HDR enhancement ratio based on a ratio between the target mean value and the respective mean value.

2. The method of claim 1, wherein the data comprises a preview, image or video frame.

3. The method of claim 1, wherein the receiving comprises receiving the data after the data has been captured by an imaging device and processed for HDR.

4. The method of claim 1, wherein the calculating of the respective HDR enhancement ratio comprises setting the respective HDR enhancement ratio to 1 in an event that the respective mean value is greater than or equal to the target mean value.

5. The method of claim 1, wherein the target mean value is user-definable with respect to each portion of the data such that a first target mean value associated with a first portion of the data and a second target mean value associated with a second portion of the data are different.

6. The method of claim 1, wherein the determining of the respective level of noise reduction corresponding to the respective HDR enhancement ratio for each of the one or more portions of the data comprises:
   for each of the one or more portions of the data:
      determining whether the respective HDR enhancement ratio is a multiple of an integer;
      mapping the respective HDR enhancement ratio to a corresponding level of sensitivity of light of a plurality of levels of sensitivity of light of an imaging device that captured the data in response to a determination that the respective HDR enhancement ratio is a multiple of an integer; and
      mapping the respective HDR enhancement ratio to an interpolated level of sensitivity of light based on the plurality of levels of sensitivity of light of the imaging device in response to a determination that the respective HDR enhancement ratio is not a multiple of an integer.

7. The method of claim 6, wherein the image device comprises a camera, and wherein the plurality of levels of sensitivity of light comprises a plurality of International Standard Organization (ISO) settings of the camera.

8. The method of claim 1, wherein the performing of noise reduction up to the respective level of noise reduction for each of the one or more portions of the data comprises skipping noise reduction for a particular portion of the one or more portions of the data in an event that the respective HDR enhancement ratio of the particular portion is 1.

9. The method of claim 1, further comprising:
   identifying a plurality of regions in the data, each region of the plurality of regions having a respective mean value associated with a level of brightness; and
   dividing the data into the plurality of portions according to the plurality of regions prior to the determining of the respective HDR enhancement ratio for each of the one or more portions of the data.

10. A method, comprising:
    receiving a high dynamic range (HDR)-processed version of a data related to digital imaging and a pre-HDR processing version of the data;
    determining a first level of HDR enhancement in a level of brightness for a first portion of a plurality of portions of the data and a second level of HDR enhancement in the level of brightness for a second portion of the plurality of portions of the data, the first level of HDR enhancement and the second level of HDR enhancement being different; and
    performing a first level of noise reduction for the first portion of the data and a second level of noise reduction for the second portion of the data, the first level of noise reduction and the second level of noise reduction being different,
    wherein the first level of noise reduction corresponds to a first amount of enhancement in intensity for the first portion of the data,
    wherein the second level of noise reduction corresponds to a second amount of enhancement in intensity for the second portion of the data different from the first amount of enhancement in intensity,
    wherein the determining of the first level of HDR enhancement in the level of brightness for the first portion of the data and the second level of HDR enhancement in the level of brightness for the second portion of the data comprises determining a respective HDR enhancement ratio for each of the first portion and the second portion of the data, and
    wherein the determining of the respective HDR enhancement ratio for each of the first portion and the second portion of the data comprises:
       determining a post-HDR target mean value associated with a level of brightness for the data; and for each of the first portion and the second portion of the data:
    determining a respective mean value associated with a level of brightness by comparing the HDR-processed version of the data and a pre-HDR processing version of the data; and
    calculating the respective HDR enhancement ratio based on a ratio between the target mean value and the respective mean value.

11. The method of claim 10, wherein the data comprises a preview, image or video frame.

12. The method of claim 10, wherein the receiving comprises receiving the data after the data has been captured by an imaging device and processed for HDR.

13. The method of claim 10, wherein the calculating of the respective HDR enhancement ratio comprises setting the respective HDR enhancement ratio to 1 in an event that the respective mean value is greater than or equal to the target mean value.

14. The method of claim 10, wherein the target mean value is user-definable with respect to each portion of the data such that a first target mean value associated with a first portion of the data and a second target mean value associated with a second portion of the data are different.

15. The method of claim 10, wherein the performing of the first level of noise reduction for the first portion of the data and the second level of noise reduction for the second portion of the data comprises determining a respective level of noise reduction corresponding to the respective HDR enhancement ratio for each of the first portion and the second portion of the data.

16. The method of claim 15, wherein the determining of the respective level of noise reduction corresponding to the respective HDR enhancement ratio for each of the one or more portions of the data comprises:
    for each of the first portion and the second portion of the data:
        determining whether the respective HDR enhancement ratio is a multiple of an integer;
        mapping the respective HDR enhancement ratio to a corresponding level of sensitivity of light of a plurality of levels of sensitivity of light of an imaging device that captured the data in response to a determination that the respective HDR enhancement ratio is a multiple of an integer; and
        mapping the respective HDR enhancement ratio to an interpolated level of sensitivity of light based on the plurality of levels of sensitivity of light of the imaging device in response to a determination that the respective HDR enhancement ratio is not a multiple of an integer.

17. The method of claim 16, wherein the image device comprises a camera, and wherein the plurality of levels of sensitivity of light comprises a plurality of International Standard Organization (ISO) settings of the camera.

18. The method of claim 10, wherein the performing of the first level of noise reduction for the first portion of the data and the second level of noise reduction for the second portion of the data comprises skipping noise reduction for the first portion or the second portion of the data in an event that the respective HDR enhancement ratio of the first portion or the second portion is 1.

19. The method of claim 10, further comprising:
    identifying a plurality of regions in the data, each region of the plurality of regions having a respective mean value associated with a level of brightness; and
    dividing the data into a plurality of portions, including the first portion and the second portion, according to the plurality of regions.

20. An apparatus, comprising:
    a computation engine configured to receive a pre-high dynamic range (HDR) processing version of an data related to digital imaging and an HDR-processed version of the data, the computation engine also configured to determine a respective HDR enhancement ratio for each of one or more portions of a plurality of portions of the HDR-processed data, the computation engine further configured to determine a respective level of noise reduction corresponding to the respective HDR enhancement ratio for each of the one or more portions of the HDR-processed data,
    wherein the respective level of noise reduction corresponds to a respective amount of enhancement in intensity for each of the one or more portions of the HDR-processed data, and
    wherein, in determining the respective level of noise reduction corresponding to the respective HDR enhancement ratio for each of the one or more portions of the data, the computation engine is configured to perform operations comprising:
        for each of the one or more portions of the data:
            determining whether the respective HDR enhancement ratio is a multiple of an integer;
            mapping the respective HDR enhancement ratio to a corresponding level of sensitivity of light of a plurality of levels of sensitivity of light of an imaging device that captured the data in response to a determination that the respective HDR enhancement ratio is a multiple of an integer; and
            mapping the respective HDR enhancement ratio to an interpolated level of sensitivity of light based on the plurality of levels of sensitivity of light of the imaging device in response to a determination that the respective HDR enhancement ratio is not a multiple of an integer.

21. The apparatus of claim 20, wherein the data comprises a preview, image or video frame.

22. The apparatus of claim 20, wherein the computation engine is configured to receive the data after the data has been captured by an imaging device and processed for HDR.

23. The apparatus of claim 20, wherein, in determining the respective HDR enhancement ratio for each of the one or more portions of the plurality of portions of the data, the computation engine is configured to perform operations comprising:
    determining a post-HDR target mean value associated with a level of brightness for the data; and
    for each of the one or more portions of the data:
        determining a respective mean value associated with a level of brightness by comparing the HDR-processed version of the data and a pre-HDR processing version of the data; and
        calculating the respective HDR enhancement ratio based on a ratio between the target mean value and the respective mean value.

24. The apparatus of claim 23, wherein, in calculating the respective HDR enhancement ratio, the computation engine is configured to set the respective HDR enhancement ratio to 1 in an event that the respective mean value is greater than or equal to the target mean value.

25. The apparatus of claim 23, wherein the target mean value is user-definable with respect to each portion of the data such that a first target mean value associated with a first portion of the data and a second target mean value associated with a second portion of the data are different.

26. The apparatus of claim 20, wherein, in the mapping of the respective HDR enhancement ratio to a corresponding level of sensitivity of light of a plurality of levels of sensitivity of light of an imaging device that captured the data or in the mapping of the respective HDR enhancement ratio to an interpolated level of sensitivity of light based on the plurality of levels of sensitivity of light of the imaging device, the computation engine is further configured to refer to a look-up table to perform the mapping.

27. The apparatus of claim 20, wherein the computation engine is further configured to perform operations comprising:
   identifying a plurality of regions in the data, each region of the plurality of regions having a respective mean value associated with a level of brightness; and
   dividing the data into the plurality of portions according to the plurality of regions prior to the determining of the respective HDR enhancement ratio for each of the one or more portions of the data.

28. The apparatus of claim 20, further comprising:
   a high dynamic range (HDR) engine configured to receive the data and perform HDR processing on the data to output the HDR-processed version of the data; and
   a noise reduction engine coupled to the computation engine, the noise reduction engine configured to perform noise reduction up to the respective level of noise reduction for each of the one or more portions of the HDR-processed version of the data.

29. The apparatus of claim 28, wherein a noise reduction function of the HDR engine is turned off at least when the HDR engine performs HDR processing on the data.

30. The apparatus of claim 28, wherein, in performing noise reduction up to the respective level of noise reduction for each of the one or more portions of the data, the noise reduction engine is configured to skip noise reduction for a particular portion of the one or more portions of the data in an event that the respective HDR enhancement ratio of the particular portion is 1.

* * * * *